(12) United States Patent
Ren et al.

(10) Patent No.: US 6,456,590 B1
(45) Date of Patent: Sep. 24, 2002

(54) STATIC AND DYNAMIC FLOW CONTROL USING VIRTUAL INPUT QUEUEING FOR SHARED MEMORY ETHERNET SWITCHES

(75) Inventors: Jing-Fei Ren, Plano, TX (US); Randall J. Landry, Merrimack, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/251,069

(22) Filed: Feb. 16, 1999

Related U.S. Application Data

(60) Provisional application No. 60/074,692, filed on Feb. 13, 1998.

(51) Int. Cl.[7] .......................... G01R 31/08; H04L 12/50
(52) U.S. Cl. ........................................ 370/229; 370/371
(58) Field of Search ................................ 370/371, 374, 370/378, 381, 383, 384, 391, 412, 413, 415, 417, 428, 429, 229, 230, 230.1, 232, 235

(56) References Cited

U.S. PATENT DOCUMENTS 6,222,822 B1 * 4/2001 Gerardin et al. ............ 370/230

\* cited by examiner

Primary Examiner—Wellington Chin
Assistant Examiner—Brenda Pham
(74) Attorney, Agent, or Firm—Pedro P. Hernandez; W. James Brady, III; Frederick J. Telecky, Jr.

(57) ABSTRACT

A virtual input queue 80 count frames of data arriving an input port $z_o$ in an Ethernet switch 10 using shared memory 50. The shared memory 50 is allocated among 1–N input ports based on either a static or dynamic memory scheme. The static scheme allocates the shared memory 50 evenly among the input ports 20 or based on the input port transmission rate. In the dynamic memory scheme, the range of a virtual input queue's occupancy is divided into an underload zone, a normal load zone and an overload zone. When the virtual input queue is in the underload zone, the input port is kept on and reserved a memory capacity equal to a low threshold. When a virtual input queue is in the normal load zone, the virtual on queue 80 is reserved an additional amount of memory and the link is kept on or is turned on whenever possible. The memory capacity not used or reserved by any input port operating in at least the underload zone and normal load zone is shared by the input ports operating in the overload zone. A dynamic threshold is calculated at each of a control epoch for the input ports 20. The input ports 20 whose virtual input queue's value exceeds the threshold are turned off (or kept off). The ports whose virtual input queue's value is below the threshold are turned on (or kept on).

27 Claims, 6 Drawing Sheets

STATIC AND DYNAMIC FLOW CONTROL USING VIRTUAL INPUT QUEUEING FOR SHARED MEMORY ETHERNET SWITCHES

RELATED APPLICATION

The present application is related to and claims priority from U.S. Provisional Patent Application No. 60/074,692 to Ren, Jing-Fei, et al., entitled FLOW CONTROL FOR SHARED MEMORY ETHERNET DEVICES which was filed on Feb. 13, 1998.

TECHNICAL FIELD OF THE INVENTION

The present invention relates to flow control in network devices, and more specifically, defines virtual input queueing as a tool to provide systems and methods of static and dynamic flow control in shared memory Ethernet switching devices.

BACKGROUND OF THE INVENTION

Recent advances in computing and network interface technologies and hardware have created an environment in which single Personal Computers (PCs or workstations) are capable of bursting out data at the capacity of a traditional Local Area Network (LAN). These advances, when coupled with the growing interest in bandwidth-intensive multimedia applications, have served to increase the prominence of new high-speed switching technologies like Asynchronous Transfer Mode (ATM) and, more recently, fully-duplex, switched Ethernet.

An Ethernet switch is a frame switch that handles variable length Ethernet frames. The Ethernet switch is fully duplexed and makes forwarding decisions based on destination addresses contained within Ethernet frame headers. Existing standards provide for up to 100 Mbps link speeds, and an Institute of Electrical and Electronic Engineers Working Group (the IEEE 8.2.3 z Working Group) has specified a standard for 1 Gbps operation (known as Gigabit Ethernet).

Fully duplexed Ethernet switches can be divided into two broad categories based on their memory architecture, which will utilize either an input queued switch or an output queued switch. Most output queued switches are implemented by using a shared memory pool to host output queues. This architecture is referred as shared memory switch architecture. FIG. 1 illustrates a block diagram of an input queue-based Ethernet switch 10 having 1–N input lines 22 connected to corresponding 1–N input ports 20 which electrically connect the 1–N input lines 22 with the Ethernet switch 10. A data frame can flow through any one of the 1–N input ports 20 and into the Ethernet switch 10, and simultaneously enter the Ethernet switch architecture 1–N receive channels 40 which couples each 1–N input port 20 to an input queue 70. The frames are then transferred to and stored by an input queue 70 in the order received. There is an input queue 70 assigned to each input port (for a total of N input queues).

1–N transmit channels 60 are in electrical connection with each of the 1–N input queues 70, and each of the 1–N transmit channels is in communication with an 1–N output port. Thus, each input queue 70 stores the received frames on an input-port basis until the output port can send the frames downstream, whereby the frames are transmitted to the appropriate 1–N transmit channel 60, such that each 1–N transmit channel 60 communicate with a corresponding 1–N output port 30. 1–N output lines 32 are connected to the 1–N output ports 30, and the 1–N lines 32 provide the path for the data frames to travel from the appropriate 1–N transmit channels 60 to the correct downstream ports. Input queue-based Ethernet switches can monitor and direct the flow of traffic on a port-by-port basis. However, input queue-based Ethernet switches achieve only 58% of the throughput of shared memory Ethernet switches due to limitation of the head-of-line blocking.

FIG. 2 is a block diagram of a shared memory Ethernet switch 10 having 1–N input lines 22 connected to corresponding 1–N input ports 20 which electrically connect the 1–N input lines 22 with the Ethernet switch 10. A data frame can flow through the 1–N input ports 20 into the Ethernet switch 10 and simultaneously enter the switch architecture at 1–N receive channels 40, which couple each of the 1–N input ports 20 to a memory 50, for temporarily storing frames, and for buffering the frames into output queues (not shown). The memory 50 also communicates with the 1–N transmit channels 60. 1–N output lines 32 are coupled between 1–N output ports 30 and the 1–N transmit channels 60, and transfer each data frame from the appropriate transmit channel 60 to various downstream ports. While achieving higher throughput than the input queue-based Ethernet switch, there is no mechanism in a shared memory Ethernet switch that allows for port-based flow control.

In addition, existing shared Carrier Sense Multiple Access/Collision Detection (CSMA/CD) networks are capable of gracefully handling periods of temporary congestion in bridges and routers through the use of collisions and random back-off mechanisms. However, in a point-to-point full-duplex (non-shared) Ethernet LAN switch, CSMA/DC methods of congestion control are no longer available. Thus, in an Ethernet switch, periods of congestion result in switch buffer overflows and frame losses.

Specifically, network congestion caused by overloading an Ethernet switch is one of the new challenges associated with fully duplexed Ethernet switches. Overload occurs in an Ethernet switch when the switch is receiving more frames than it can direct. Ethernet switches are equipped with buffering capability to accommodate congestion over a short time period. However, if the overload condition persists, the switch buffer will become full, causing switch to discard frame. This is referred as congestion.

Standardization efforts for full-duplex operation of Ethernet (switched Ethernet) have focused attention on the need for flow control at MAC (Media Access Control) sublayer. In the IEEE 802.3x standard, an optional MAC Control Sublayer (MAC Control) has been defined. The scheme is intended to provide vehicle for flow control on a hop-by-hop basis by allowing a port to "turn off" or "turn on" the transmitter of the upstream device for certain period of time. The basic vehicle for transmitting flow control information from one Ethernet port to the upstream device is a MAC Control frame, a special MAC frame. Control frames are of minimum legal size (64 bytes). The MAC Control Opcode field of the MAC Control frame specifies a Pause opcode. The MAC Control Parameters defines Pause Time which indicates the amount of time for which the upstream link transmitter should stop transmitting data frames. Upon receiving a new MAC Control Frame, the port of the upstream device will stop transmission for a time period specified in the new MAC Control Frame regardless of the previous MAC Control Frame. Conversely, sending a MAC Control Frame with Pause Time being set to zero will "turn on" a paused link.

The IEEE 802.3x flow control was developed with the input queued switch architecture in mind. Implementing flow control in an input queued Ethernet switch is straightforward as buffer occupancy of an input queue provides a good indication of overload status on the port. However, this is not the case for the shared memory switch. FIG. 3 graphically illustrates the problem. In FIG. 3, switch memory is represented on the vertical axis, the total available switch memory is represented as M and time is represented on the horizontal axis. Also, let the buffer occupancy of the output queue of output port A be represented by dashed-dot line and the total buffer occupancy be represented by the solid line.

At time $t_0/t_a$, a input port A receives frames requiring the use of $m_a$ memory, while at time $t_b$ input port B receives frames requiring the use of $m_b$ memory, resulting in a total memory use of $m_a+m_b$. At time $t_c$, input port receives frames requiring the use of $m_c$ memory. At a time $t_1$, input port C begins receiving more and more frames of data, and by time $t_2$, input port C is receiving data at a rate that causes the total switch memory demanded ($m_a+m_b+m_c$) to exceed the available memory, M. Since shared memory Ethernet devices do not monitor traffic on the input ports, to deal with this situation, the switch is forced to pause all upstream devices. For simplicity, the pause is shown as being instantaneously implemented at $t_2$. As the frames in the switch memory exit the switch downstream, the total memory used by the switch decreases until the pause is over and frames are again introduced into the switch, here shown at time $t_3$.

Thus, during to $t_0$ to $t_2$, the memory used by the output queue of output port A increases while the memory used by other output ports is kept small, indicating that output port A is overloaded due to excessive frames destined to output port A, while at the same time other ports (input and output) may still handle frames destined to them. If output port A uses the MAC Control frame to pause transmission of upstream devices, it has to send the "pause" MAC Control Frames from all the input ports to the input ports upstream devices, as frames arriving on any port may be destined to output port A. When the switch pauses all the upstream devices during $t_2$ to $t_3$, the total buffer occupancy decreases. During this period, the switch performance is impaired as all other output ports (except port A) do not have frames to send. As the frames in the switch memory exit the switch downstream, the total memory used by the switch decreases until the pause is over and frames are again introduced into the switch, here shown at time $t_3$.

As can be seen from FIG. 3, in this example, only input port C exceeded a reasonable rate of frame transfer, and thus, it was only necessary to pause the upstream device feeding input port C. However, in shared memory devices it is impossible to tell which input port a frame arrived in, and thus all upstream devices must be paused. This means data transfers are interrupted on the upstream devices feeding frames to input ports A and B, as well as input port C. When transmissions are resumed, retransmissions of the data that should have been receive between time $t_2$ and $t_3$ (frame losses) may have to be requested. Thus, overflows and frame losses often require retransmissions that take up time and degrade network performance.

As can also be seen from FIG. 3, statistics of the output queues do not provide much useful information to identify which input port is receiving excessive frames destined to the overloaded output queue. Blindly pausing all ports when an output queue is overloaded will block frames which otherwise can be handled by the switch.

Flow control schemes for Ethernet switches have to use as little state information as possible for easy implementation because Ethernet switches have to be cost competitive and the current provision of the flow control vehicle does not allow fine level control. Furthermore, it is very desirable that the schemes maintain loss free transmission in Ethernet switches.

In order to minimize the loss of frames and data frames, it would be advantageous to provide a flow control tool for shared memory fully-duplexed Ethernet switches. It would also be advantageous to provide systems and methods of using such a tool to maximize system simplicity and efficiency. The present invention provides such a tool, such systems and corresponding methods.

SUMMARY OF THE INVENTION

The present invention provides a system for monitoring frame traffic at the input port an Ethernet switch having shared memory and an input port for coupling an input line to the shared memory. To accomplish the input port monitoring, a virtual input queue disposed in the Ethernet switch is used.

The system may further comprise a receive channel coupled between the input port and the shared memory, an output port coupled between the shared memory and an output line, a transmit channel that communicates with the shared memory and the output port, or all of the above. The virtual input queue is preferably in communication with both the receive channel and the transmit channel. In addition, this configuration accommodates an Ethernet switch which has a plurality of receive channels, a plurality of virtual input queues, and a plurality of transmit channels.

The present invention also provides a method of monitoring frame traffic at an input port in an Ethernet switch having a shared memory. The method assigns a virtual input queue to monitor the input port, monitors the input port (for detecting the arrival of a frame at the input port), and increments the virtual input queue when the arrival of the frame is detected. The method may further comprise the steps of monitoring an output port, for detecting the departure of the frame whose arrival was previously detected, and decrementing the virtual input queue when the departure of the frame is detected.

The incrementing step may increase the value of the virtual input queue an amount based on the size of the frame. Likewise, the decrementing step may decrease the value of the virtual input queue an amount based on the size of the frame.

The present invention is also a method of static memory allocation in an Ethernet switch having a shared memory. The method of static memory allocation partitions the shared memory among a plurality of virtual input queues to create a memory value for a virtual input queue which monitors an input port, increments the virtual input queue when a frame arrives at the input port, and pauses an upstream device if the incremented value of the virtual input queue exceeds the memory value for the virtual input queue.

The partitioning step may divide the memory evenly among the plurality of virtual input queues, or may divide the memory among the virtual input queues proportionately to the data rate of each of the plurality of virtual input queues.

The pausing step may pause the upstream device for a predetermined period of time, or for a predetermined number of data transfers. The static memory allocation method may monitoring an output port and decrementing the value of the input queue when the frame departs the Ethernet switch. Furthermore, the static memory allocation method may activate the upstream device when the value of the virtual input queue is less than the memory value.

Accordingly, the static memory allocation method may take the form or the following steps: partitioning the shared memory among a plurality of virtual input queues to create a memory value for a virtual input queue, monitoring frame traffic at an input port with the virtual input queue, detecting the arrival of a frame at the input port, incrementing the virtual input queue, testing whether or not the incremented value of the virtual input queue exceeds the memory value for the virtual input queue, and pausing an upstream device if the incremented value of the virtual input queue exceeds the memory value for the virtual input queue.

The present invention is also a method of dynamic memory allocation in an Ethernet switch having a shared memory. The method partitions the shared memory among a plurality of virtual input queues to create a first set of memory values such that a virtual input queue which monitors an input port has a memory value. Then, the method increments the virtual input queue when a frame arrives at the input port, and, after a control epoch, repartitions the shared memory among the plurality of virtual input queues to update the memory value of the virtual input queue, such that the second set of memory values is based on the data rate of the input port.

The dynamic memory allocation method may pause an upstream device connected to the input port if the incremented value of the virtual input queue exceeds the memory value for the virtual input queue. Furthermore, the partitioning step may divide the memory evenly among the plurality of virtual input queues, or proportionately to the data rate of each of the plurality of virtual input queues.

The repartitioning step of the dynamic memory allocation method typically classifies data rates into a plurality of data rate zones, such as an underutilization zone, a normal zone, and an overutilization zone. An underutilization threshold is typically defined as a boundary between the underutilization zone and the normal zone, and an overutilization threshold is typically defined as a boundary between the normal zone and the overutilization zone. Note that the underutilization threshold is a lower data rate than the overutilization threshold.

The repartitioning step may assign the virtual input queue a minimum memory if the virtual input queue value is less than the underutilization threshold, and a normal memory if the virtual input queue value is at least equal to the underutilization threshold. Likewise, if the virtual input queue is at a level equal to or higher than the overutilization threshold, the repartitioning step assigns the virtual input queue a proportioned memory, such that the proportioned memory is the amount allocated from the shared memory which is not assigned to other virtual input queues. In this way, all excess memory is allocated to the queues monitoring the highest levels of activity. The minimum memory may comprise a data latency memory portion. The underutilization threshold is often set to three maximum data frame sizes lower than the overutilization threshold.

The proportioned memory value is the value may be obtained by subtracting the memory allocated to virtual input queues having minimum memory, the memory allocated to virtual input queues having normal memory, and the latency memory requirements from total memory, and then distributing the difference to the remaining virtual input queues based on data transfer rates.

The pausing step may pause an upstream device if its virtual input queue value exceeds a proportioned memory value, if its virtual input queue value exceeds an overutilization threshold value, or if its virtual input queue value exceeds an underutilization threshold value, depending on the current status of the upstream devices feeding frames to the input ports.

The pausing step may pause the upstream device for a predetermined number of data transfers, or a predetermined amount of time. In addition, the dynamic memory allocation method may monitor an output port and decrement the value of the input queue when a frame departs the Ethernet switch. The upstream device may be activated when the value of the virtual input queue is less than the memory value.

BRIEF DESCRIPTION OF THE DRAWINGS

Other aspects of the invention including specific embodiments are understood by reference to the following detailed description taken in conjunction with the drawings in which.

DETAILED DESCRIPTION OF A PREFERRED EMBODIMENT

Figure 1:
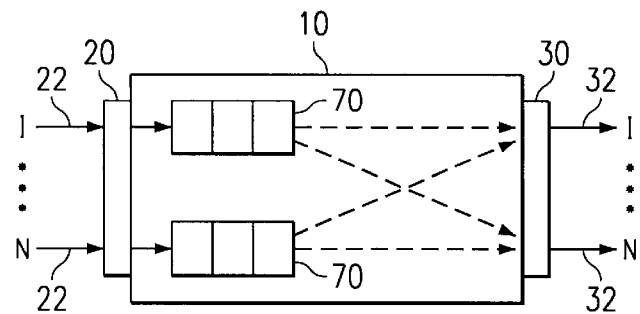
FIG. 1 illustrates a block diagram of an input queue Ethernet switch.

The present invention defines a virtual input queue and then applies the virtual input queue as the control device in two flow control schemes, a static threshold scheme and a dynamic threshold scheme, for a shared memory Ethernet switches. Inside the switch, frames are output queued and scheduled for transmission in the same way as a shared memory switch without the virtual input queue and flow control. The two flow control schemes differ by how the shared memory is partitioned. The static threshold scheme gives a fixed partitioning of the total memory capacity to individual input ports. Each port turns on or off its upstream port according to the virtual input queue's occupancy, regardless of the congestion status of other input ports, to ensure that the used memory by the port never exceeds its given share. The dynamic threshold scheme allocates more memory to the ports that need more memory, and thus requires fewer system pauses than the static scheme.

To handle overflows, the present invention utilizes the Media Access Control (MAC) Control Sublayer (MAC Control) defined in IEEE 802.3x standard. The basic vehicle for transmitting flow control information from one Ethernet port to the upstream device in the MAC Control layer is the "MAC Control Frame." A MAC Control field within the frame (called the "MAC Control Opcode" field) contains the command to be implemented by the upstream device. Currently, a command called "Pause" is the only opcode command defined, and it indicates the amount of time the upstream linked transmitters should stop transmitting data frames to allow the port sending the control frame to recover from a congested state. The present invention uses the Pause command on a port-by-port basis to control frame flow to a switch.

The Pause command is only effective on the transmission of data frames. A paused port is still allowed to send MAC Control Frames to its upstream link device, and a port may send a new MAC Control Frame to overwrite the previous one. Upon receiving a new MAC Control Frame, the ports of the identified upstream devices will stop transmission for a time period specified in the new MAC Control Frame regardless the previous MAC Control Frame. Conversely, sending a MAC Control Frame with pause time being set to zero will "turn on" a paused link.

Virtual Input Queueing

In a typical shared memory switch, there is a RAM (Random Accessed Memory) based memory pool shared by all input and output ports. Each frame arriving at an input port is written to logical output FIFO queue (a logical output queue exist for each output port). As flow control is concerned, statistics associated with the logical output queues, such as queue lengths, do not provide much useful information regard which input device link is sending too fast. Thus, virtual input queueing is introduced as a system and method for identifying the congestion status of individual input ports in shared memory switches so as to enable the switch to selectively turn on and off an upstream link.

Figure 4:
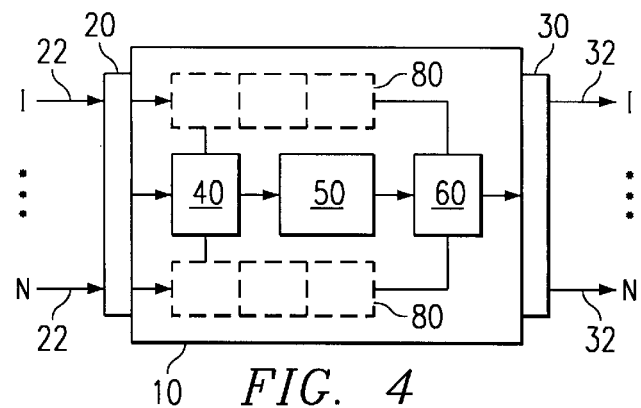
FIG. 4 provides a block diagram of a shared memory Ethernet switch according to the teachings of the present invention which implements virtual input queues.

FIG. 4 provides a block diagram of a shared memory Ethernet switch 10 according to the teachings of the present invention, which implement virtual input queues 80. Frames arrive at the Ethernet switch 10 from upstream input devices on 1–N input lines 22, which are electrically connected to corresponding 1–N input ports 20. 1–N received channels 40 bring the 1–N input ports 20 into the Ethernet switch architecture and couple the 1–N input ports 20 the shared memory 50. Thus, the frames are passed through the I–N received channels 40 to shared memory 50 where frames are stored.

I–N virtual input queues 80, are in communication with the 1–N received channels 40 (and/or 1–N input ports 20) such that one virtual input queue monitors each of the 1–N receive channels and counts each frame arriving at a received channel 40. In the shared memory 50, the frames are then typically aligned into output queues (not shown) such that each output queue corresponds to one of I–N output ports 30. 1–N transmit channels 60 are coupled between the shared memory 50 and 1–N output ports 30 so that the frames are then passed from the shared memory 50 to an appropriate output port. The frames physically exit the Ethernet switch 10 through the I–N output ports 30, which couple the I–N transmit channels 60 to the I–N output lines 32. Accordingly, each virtual input queue 80 is also coupled to the I–N transmit channels 60 such that when a frame exits any transmit channel 60, the virtual input queue 80 which counted the frame upon its entry into the Ethernet switch, decrements.

A virtual input queue can also be defined by its functionality. The virtual input queue records the number of data units (frames or bytes) that have arrived at a specific input port and are currently residing in the switch. Thus, there is one virtual input queue for each input port. The virtual input queue records the "occupancy" of the shared memory that has passed through the input port associated with the virtual input queue, and thus a virtual input queue increments when frames arrive to the monitored input port, and decrements when frames that arrived through that port exit the switch through any output port. Accordingly, a large virtual input queue implies that the upstream device port sends frames too fast for the switch to handle to its corresponding input port.

Note that the virtual input queues 80 are used for flow control and management purposes. Inside the switch, Ethernet frames are routed and buffered in the same way as in a shared memory switch which does not use virtual input queues. This allows the complete memory pool to still be used by all the ports. The virtural input queues are truly virtual—there is no real input queue in the switch—which allows the queues to be implemented by using a simple counting mechanism.

With the information from the virtual input queues, it is possible to implement intelligent flow control schemes rather than blindly pausing all the links when congestion occurs in a shared memory switch. And, though the preferred embodiment discussed herein contemplates the use of byte based virtual input queues, virtual input queues may be measured in either the number of frames as well.

Each virtual input queue is a counter for an input port identified by the input port index. Let us denote the virtual input queue of input port i, Vi. When a frame (also called a frame) arrives at input port i, Vi is increased by the length of the frame. When the frame is eventually sent out from the switch, via any output port. Vi is decreased by the length of the frame.

Since it is necessary to identify the input port at which the frame has arrived when it leaves the switch, each frame needs to bear an input port index with it. The input port index could be stored with the pointer to the frame in the memory pool in a shared memory switch by using the switch's address look-up engine. For an N-port switch, each frame needs logN bits to keep the port index. An alternative approach would be to perform a "look-up" to map the source address of the frame to an input port index when sending a frame out of the switch. This would save memory storage space, but would require a fast look-up engine.

An Ethernet switch needs to handle multicast (or broadcast, which is considered as a special case of multicast). There are two methods for a shared memory switch to replicate frames. The switch may replicate a multicast frame upon receiving the frame and put the copies to the logical output FIFO queues for the destined ports. Alternatively, the switch may store only one instance of the multicast frame and make a copy each time when sending the frame out from the destined output port. Depending on which replication method is used to handle multicast, the update of virtual input queues is slightly different.

When copies are made upon receiving and stored in the memory pool, the virtual input queue corresponding to the port where the multicast frame arrives is incremented each time when a replication is made and put into the shared memory. When a replication is sent out from the destined output port, the virtual input queue is decremented. In this way, a multicast frame is treated as multiple frames coming from the same input port. If the switch replicates multicast frames at output, since there is only one instance of each frame stored in the shared memory, the virtual input queue is only incremented once upon a frame's arriving. However, since a multicast frame is removed from the memory only after all the necessary replications are made to the destined output ports, the virtual input queue is only decremented when the last replication is made. With this modification, the virtual input queues are able to keep track of the usage of the memory pool by frames from individual ports for both unicast and multicast frames.

In operation, a virtual input queue is activated by data frames arriving on a port i. Let $R_i$ denote the data rate of port i. When the upstream link transmitter has data to send and is not paused, it sends frames to the switch at rate $R_i$. The frames are counted and wait at the appropriate logical output queues for destined ports (quite commonly interleaved with frames which arrived from other ports having their own virtual input queues, but destined for the same output ports). An output port serves up frames in a logical output queue in FIFO order if the switch's output port is not turned off by the downstream port on the link. A frame that is counted when it arrives at a virtual input queue may be sent to a different logical output queue, and may be in an unpredictable position within the output queue. Thus, it is difficult to predict the rate at which frames counted by a virtual input queue are transmitted out of the switch.

The present invention overcomes these system limitations through the use of the MAC Flow Control frames by using the MAC Control frames to turn on and off the upstream link transmitter on a port-by-port basis according to the occupancy of the corresponding port's virtual input queue. More specifically, when a link needs to be turned off, we send to the upstream port a MAC Flow Control frame with the maximum Pause Time (called OFF control frame), and when a link needs to be turned on, we send a MAC Flow Control frame with zero Pause Time (called ON control frame). We could, of course, pause an upstream device for a specific time interval based on the occupancy level of its corresponding virtual input queue.

Figure 5A:
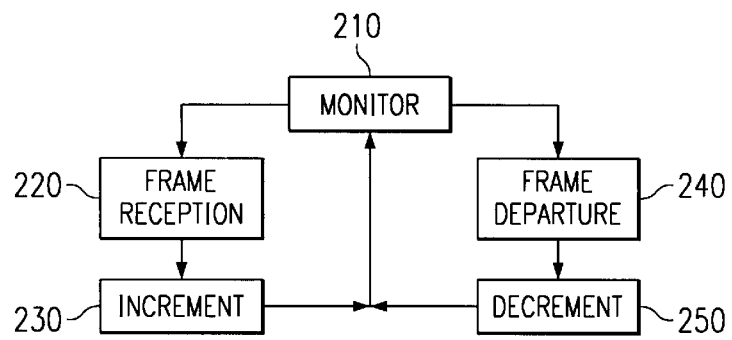
FIG. 5a is a block flow diagram of a virtual input queue algorithm that practices the teachings of the present invention.

Accordingly, the methodology of a virtual input queue can be explained by turning to a flow chart. FIG. 5a is a block flow diagram of a virtual input queue algorithm that practices the teachings of the present invention. Each virtual input queue 80 waits for the reception of an incoming frame on a receiver channel 40, and also monitors all of the transmit channels 60 for a frame departing the Ethernet switch 10 which originally arrived to the input port the virtual input queue 80 is monitoring, in a monitor, step 210. If a frame is detected as arriving at the Ethernet switch 10 on the input port being monitored by the virtual input queue 80, a frame reception, step 220, is triggered where the virtual input queue 80 records the arrival of the frame and increments a predetermined amount in an increment, step 230. The amount of the increment can be either a fixed iteration for each frame or a variable iteration, perhaps based on a bit or byte size of the frame. If a frame which arrived on the virtual input queue's input port is detected as departing the Ethernet switch 10, a frame departure, step 240, is initiated where the virtual input queue 80 decrements a predetermined amount in a decrement step 250. In the decrement, step 230, the amount of the decrement can be either a fixed iteration for each frame, or a variable iteration, based on the bit or byte size of the frame. Both the increment and the decrement must use the same type of iteration, and a frame should cause the same size decrement when leaving the switch as it caused an increment when entering the switch.

Figure 5B:
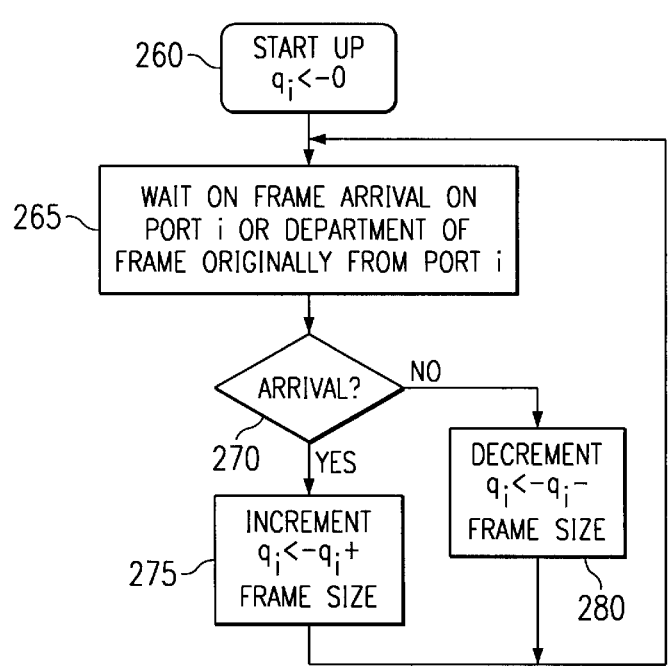
FIG. 5b provides another embodiment of a virtual input memory queue.

FIG. 5b provides another embodiment of a virtual input memory queue. In a start-up, step 260, the instantaneous value of the virtual input queue's counting variable, $q_i$, is set to 0. After the input queue's counting variable is set to 0, the virtual input queue proceeds to monitor the input port and the output ports for the arrival of a frame on the monitored input port, or for the departure of a frame originally received on the input port on any output port, in a wait, step 265. Next, the virtual input queue algorithm detects the arrival or departure of a frame in an arrival, step 270. If a frame is detected arriving at the input port, then the qi value of the virtual input queue increases by the size of the received frame in an increment, step 275. In the event a frame is detected leaving the switch, the virtual input queue decreases the size of $q_i$ by the size of the frame in a decrement, step 280.

Note that there is a response latency for turning an upstream port off, defined as the time elapsed from the instant when an OFF frame is generated at the port in question to the instant when the last data bit from the upstream port is received before the pause period is observed at the port, called generally $D^{off}$. It consists of four components. First, when the OFF frame is generated, the transmitter of port i may be transmitting a data frame and could take up to 1,518 Byte transfers, the maximum Ethernet frame size, before completing the data frame transfer. The second component of the response latency is a propagation delay between the switch and the device upstream which is sending data to the port. Both the propagation delay and the processing delay may be experienced by the upstream device. Thus, the response latency could be $D_i^{off}=3,036+2BR_i/8$ bytes, where the divisor 8 is needed as $R_i$ is measured at bits/s. We may also define a response latency for turning the link partner on as the time elapsed from the instant when an ON frame is generated to the instant that the first data bit is received at the local port, given that the link partner was turned off and it has data to send. We may show that $D_i^{on}$, the maximum response latency for turning the link partner of port i on, is $1,518+2BR_i/8$ bytes. These response latencies require a small portion of the shared memory, however, as Ethernet is primarily designed for local area network, typically, propagation delay contributes an insignificant amount to the response latency. Both $D^{off}$ and $D^{on}$ are measured in bytes, representing the number of bytes transmitted during a time period at a specific port's speed Static Threshold System and Method The static threshold scheme fixes partitioning of a total buffer space "M" among the input ports from the perspective of the virtual input queues. More specifically, let denote the buffer space allocated to input port i such that $$\sum_{j=0}^{N-1} M_j = M$$

One way to partition the memory pool is to allocate in proportional to the port speed. That is (1)

$$M_i = \frac{MR_i}{\sum_{j=0}^{N-1} R_j}$$

This partitioning provides more memory share for switch ports with higher speeds. As Ethernet has three different standardized speeds, the 10 Mbits/s, 100 Mbits/s and 1,000 Mbits/s, some Ethernet switches may support ports with different port speeds. For instance, a switch may have a few 10 Mbits/s ports and one or more 100 Mbits/s ports or a few 100 Mbits/s ports and one or more 1,000 Mbits/s ports. The high-speed ports are generally connected to servers or backbone switches that are capable of bursting out data at high rates. It is reasonable to provide such ports with a greater share of the memory. Let $q_i$ denote the value of the virtual input queue $V_i$. The static threshold scheme tries to maintain the virtual input queues within the memory partitioning provided to each port by equation (1), or $$q_i \le M_i, \text{ for } (0 \le i \le (N-1)). \quad (2)$$

This ensures that there is no buffer overflow. The partitioning limitation is enforced by sending an OFF frame from port i to the upstream port when qi reaches a high "water mark," $H_i$. This would ensure that the value of $q_i$ does not exceed its allocated memory all the time.

After at most $D_i^{\text{off}}$ bits are received following the generation of the OFF frame, no further frames arrive at the port and the virtual input queue at port i is no longer incremented. As a result, $V_i$ decreases as the frames it counted at the input port exit through one or more output ports. The upstream port needs to be turned on promptly when $V_i$ has room for more frames. Let $L_i$ denote a low water mark. If, the value of the virtual input queue is less than the low water mark, $L_i$, an ON frame is sent to the upstream port to turn it on.

When the MAC Control Frames are sent to the upstream port in the way described above, the virtual input queue value, $q_i$, fluctuates between $L_i$-$D^{on}$ and Hi-$D^{off}$, provided that the upstream port has enough data to send. The high water mark Hi could be set to $M_i$—$D_i^{\text{off}}$ to keep $q_i$ as close to $M_i$ as possible before the upstream port is turned off. However, there is a trade-off in deciding the low water mark $L_i$. As we mentioned before, it is advantageous to buffer as many frames as possible in the shared memory switch rather than in the upstream device. Therefore, the low water mark $L_i$ should be set sufficiently high so that the virtual input queue value $q_i$ stays high when the traffic is heavy. However, if $L_i$ is set too close to $H_i$, MAC Control Frames will be generated and sent to the upstream port frequently. This would consume bandwidth on the link in the direction from the port to the upstream device, generating high flow control overhead. We can calculate the upper bound of the overhead assuming that the upstream port has sufficient data to send.

The minimum number of bytes received by port i between a pair of ON and OFF frames are sent to the upstream port is $H_i$-$L_i$+$2B_iR_i$. This occurs under the following condition: An OFF frame is generated and sent to the upstream port when Hi is reached. The OFF frame incurs the minimum response latency. That is, the OFF frame is sent out upon being generated and the upstream port just has finished sending a frame when the OFF frame arrives. During the response latency period, port i receives bytes of data. The virtual input queue length is brought down to $L_i$ after $H_i$-$L_i$+$2B_iR_i$ bytes of data are served. Then an ON control frame is generated and sent to the upstream port. Meanwhile, service to the virtual input queue is stopped because the output ports are busy transmitting frames belonging to the other virtual input queues or they are paused by their own downstream ports, until $q_i$ reaches Hi again. Since in the worst case, only $H_i$-$L_i$+$2B_iR_i$ bytes of data are received at port i between transmission times of a pair of OFF and ON frames, the flow control overhead is bounded by (3)

$$\frac{128}{H_i - L_i + 2B_iR_i}$$

where 128 is the number of bytes in a pair of ON and OFF frames. In practice, the worst case is unlikely incurred frequently. Thus, we expect the control overhead to be significantly lower than the upper bound. To strike a balance between the control effectiveness and overhead, we may select the difference between the high water mark and the low water mark to be one to three maximum size V frames.

Figure 6A:
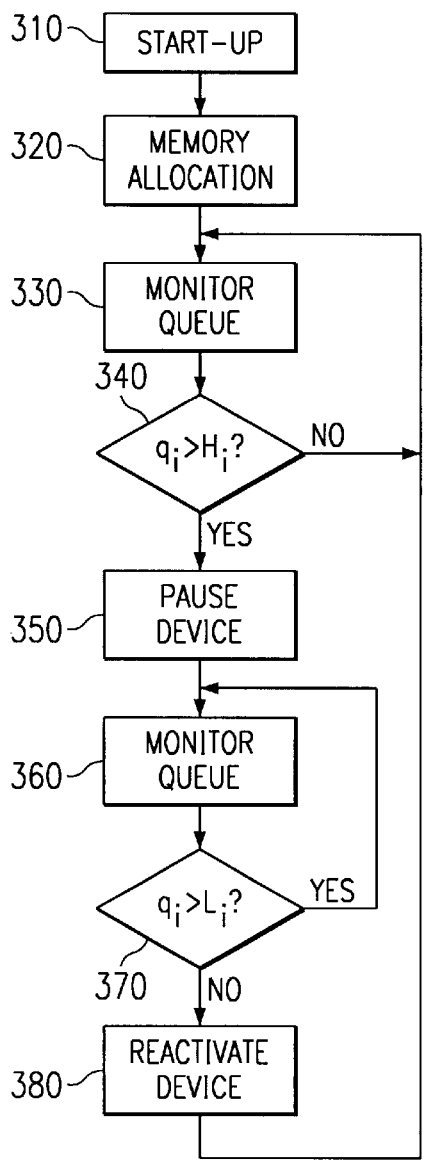
FIG. 6a illustrates a block flow diagram for practicing a preferred method for a static threshold algorithm of static memory allocation and control using virtual input queues.

FIG. 6a illustrates a block flow diagram for practicing a preferred method for a static threshold algorithm of static memory allocation and control using virtual input queues 80. In a startup, step 310, a processor (not shown) in the shared memory Ethernet switch 10 determines the total memory available. Next, in a memory allocation, step 320, the total shared memory 50 is allocated among virtual input queues 80. The memory may be allocated according to any number of methods, perhaps providing each virtual input queue 80 an equal share of memory, but preferably by sharing the memory proportionately based on the input port bandwidth of each input port, as discussed above and shown in equation (1). The memory allocation step also uses this information to set the high water mark $H_i$ and the low water mark $L_i$. The static threshold algorithm then queries each virtual input queue 80 in a first monitor, step 330. Next in a first test, step 340, the static threshold algorithm checks to see if the virtual input queue value, $q_i$, is greater than its allocated memory high water mark, $H_i$. If not, the static threshold algorithm returns to the first monitor, step 330. If $q_i$ is greater than $H_i$, then the static threshold algorithm proceeds to pause the upstream device feeding the virtual input queue 80 by sending a MAC Control message with a maximum desired pause value as discussed above in a pause device, step 350. The next time the static threshold algorithm will query the virtual input queue 80 constitutes a second monitor, step 360. Next in a second test, step 370, the static threshold algorithm checks again to see if the virtual input queue value, $q_i$, is greater than $L_i$. If $q_i$ remains greater than or equal to $L_i$, then the static threshold algorithm returns to the second monitor, step 360. If $q_i$ is less than $L_i$, then the static threshold algorithm proceeds to reactivate the upstream device feeding the virtual input queue 80 by sending a MAC control message with a zero pause value in a pause device, step 350. The static threshold algorithm then returns to the first monitor, step 330.

Figure 6B:
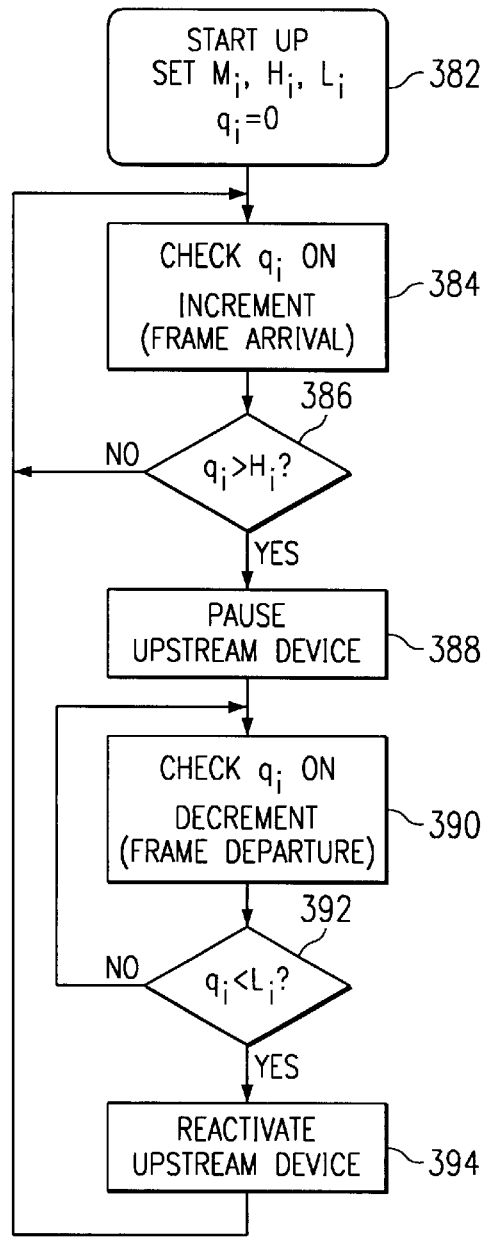
FIG. 6b illustrates the monitoring of the input port or output ports in the static allocation algorithm keyed to an event rather than time (asynchronous operation)

Alternatively, as shown in FIG. 6b, the monitoring of the input port or output ports in the static allocation algorithm can be keyed to an event rather than time (asynchronous operation). In a set, step 382, the static allocation algorithm starts up by allocating memory Mi to the virtual input queues, and by setting the high water mark, Hi, and low water mark, Li for each queue. Then, in a check qi on increment, step 384, the virtual input checks the value of qi when a frame arrival is detected. If the value of qi is greater than Hi, then, in a first check, step 386, then the static allocation algorithm pauses an upstream device in a pause, step 388. Otherwise, if the value of qi is not greater than Hi, the static allocation algorithm returns to the check qi on increment step, 384, and awaits the arrival of another frame.

Should a device be paused in the pause, 388, the static allocation algorithm advances to a check qi on departure, step 390 where the virtual input queue value, qi, is checked when a frame which arrived on the input port monitored by the virtual input queue departs on any output port. If, in a second check, step 392, the value of qi is less than the low water mark, Li, then the static allocation algorithm proceeds to a reactivation, step 394, that turns back on the upstream device port feeding frames to the input port being monitored. Following the reactivation, step 394, the static allocation algorithm returns to the check qi on increment, step 384. Should, in the second check, step 392, qi still be greater than Li, the static allocation algorithm returns to the check qi on decrement, step 390.

The major advantage of the static scheme is that every virtual input queue is reserved approximately $M_i$ memory regardless the other ports' congestion condition. As a result, the scheme is extremely simple. The control decision is solely based on the queue length of individual virtual input queues.

Dynamic Threshold Method

The dynamic threshold method reserves a certain low amount of memory for the virtual input queues whose occupancy is very low, and provides the other virtual input queues with the remaining memory space. This helps prevent frame loss due to buffer overflow. To this end, each virtual input queue is divided into an underload zone (zone 0) which is separated from a normal load zone (Zone 1) at a underload threshold, $U_i$, and an overload zone (zone 2) which is separated from the normal load zone by an overload threshold, $O_i$. Since the dynamic threshold method requires more computation, a control decision is made in a time interval P, typically longer than the time slot. An example of P may be 10 times the transmission time required by a minimum-size frame at the highest speed port in the switch. Depending on which zone the virtual input queue is in, different control policies are applied for sending MAC Control Frames. The scheme may be described more specifically by letting $q_i$ denote the instantaneous value of the virtual input queue. When $q_i$ is less than $U_i$, $V_i$ is said to be in zone 0, or the underload zone and is denoted by I an an element of $z_0$. A memory of capacity $U_i$ is reserved for the virtual input queue if i is an element of $z_0$. When $q_i$ exceeds $U_i$ but is less than $O_i$, Vi is said in zone 1, or the normal load zone, and is denoted by i as an element of $z_1$. Virtual input queues in zone 1 are reserved a memory of capacity of min($q_i$+$PR_i$, $O_i$) if possible, and will not turn off the upstream port except under some very special circumstances. The memory capacity not reserved is shared among those ports which are in zone 2, or overload zone, meeting condition $$q \geq O_i. \quad (4)$$

The value of $U_i$ determines amount of memory capacity, which should be reserved when $V_i$ is underloaded. The value of $O_i$ represents $V_i$'s fair sharing of memory. When all the ports of the switch are heavily loaded, we expect $q_i$ to fluctuate around $O_i$. In practice, $U_i$ can be one or a couple of maximum-sized frames and $O_i$ may be chosen using the same method as is used to choose the high water mark in the static threshold scheme, that is $O_i=H_i=M_i-D_i^{off}$.

Let $T_i$ denote the dynamic threshold for port i if it is in overload zone. The dynamic threshold represents port i's fair sharing of the memory available to all the overloaded ports weighted by the port speed. According to the memory sharing policy, we have (5)

$$\sum_{i \in z_0} \max(q_i + PR_i, U_i) + \sum_{i \in z_1} \min(q_i + PR_i, O_i) + \sum_{i=0}^{N-1} D_i^{off} + \sum_{i \in z_2} T_i = M$$

$$T_j/T_k = R_j/R_k, j,k \in z_2 \quad (6)$$

The first term on the left hand side of (5) is the memory space reserved for underloaded virtual input queues. The second term is the memory space reserved for the virtual input queues in the normal load zone. In those terms, we have included $PR_j$ for possible increase of the virtual input queue during next control interval. The third term is the memory space required to accommodate the response latency for turning ports off. Finally, the forth term represents the memory space used by all ports in zone 2 if their virtual input queues converge to $T_i$ memory. The terms determine a partitioning of the total memory whose capacity is M. Equation (6) relates the dynamic threshold of a port to the speed of the port. Solving $T_i$ from (5) and (6), we obtain (7)

$$T_i = \frac{R_i}{\sum_{j \in z_2} R_j} \left[ M - \sum_{i \in z_0} \max(q_i + PR_i, U_i) - \sum_{i \in z_1} \min(q_i + PR_i, O_i) - \sum_{i=0}^{N-1} DV \right]$$

Based on $T_i$, control decisions are made—i.e., to turn on or off appropriate ports.

Let ON and OFF denote the sets of ports which are set in ON and OFF state, respectively. Our policy is to turn off the upstream ports corresponding to those ports whose virtual input queues exceed the dynamic threshold and turn on the upstream ports corresponding to the ports whose virtual input queues are below $T_i$–G. To enable efficient utilization of memory while achieving a low control overhead, we may choose G to be one to three maximum-sized frames, the same as the difference between the high water mark and low water mark. The control policy may be written as $$i \in OFF, if q_i > T_i$$

$$i \in ON, if q_i < T_i - G \quad (8)$$

That is, the ports whose virtual input queue exceeds the threshold are in OFF and the ports whose virtual input queue below the low water mark are in ON. If $q_i$ is between $T_i$ and $T_i$–G, the state of port i is unchanged. In order to avoid data frame loss due to buffer overflow in the future, we further verify that the total buffer occupancy of the shared memory will not exceed the memory capacity M if we take proper control action at the next control epoch. In the worst case, port i's virtual input queue may reach qi+PRi+$D_i^{off}$ when port i is on.

Let $E_i$ denote the elapsed time since the latest OFF frame was generated at port which has been turned off. If port i's upstream transmitter is not turned ON, in the worst case, the virtual input queue may reach $q_i$+max($D_i^{off}$–$R_i E_i$, 0). To guarantee that buffer overflow will never happen, we check condition $$\sum_{i \in ON} (q_i + PR_i + D_i^{off}) + \sum_{i \in off} [q_i + \max(D_i^{off} - R_iE_i, 0)] \leq M \quad (9)$$

If condition (9) holds, then the total buffer occupancy of the shared memory will never exceed the memory capacity if we take proper control action at the next control epoch. If (9) does not hold, however, we do need to turn off more links at the current control epoch so that the total buffer occupancy will not exceed the memory capacity if we take proper control action at the next control epoch. We start from turning off links for all ports in zone 2. The control policy is modified as $i \in$ OFF,if $q_i > 0_i$ $i \in$ ON,if $q_i < 0_i$-G  (10)

To guarantee loss free, we check condition (9) with the new sets of ports in ON and OFF states. If condition (9) holds, then we become safe by using control policy in (10). Otherwise, we need to turn ports off more aggressively. The control policy now is modified as $i \in$ OFF,if $q_i > U_i$ $i \in$ ON,if $q_i < U_i$  (11)

We may prove that the buffer will never overflow and the ports whose virtual input queue is in zone 0 will never be turned off under policy (11). In normal operation condition, we expect the control policy (8) to be used most time.

Figure 7:
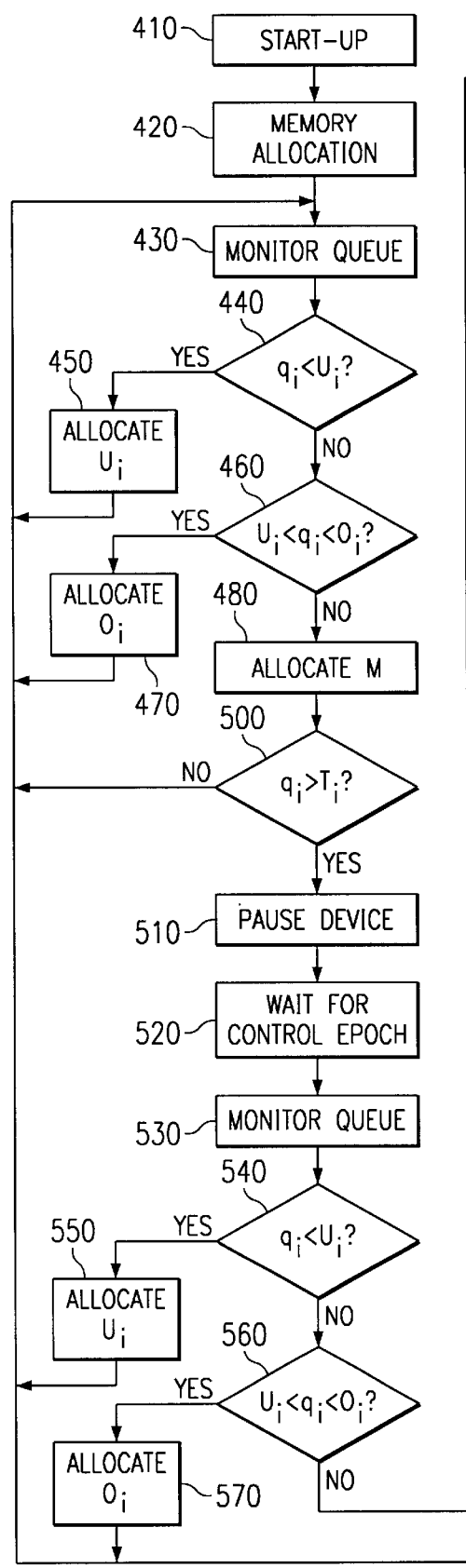
FIG. 7 provides a block flow diagram of a preferred method of dynamic memory allocation in a shared memory Ethernet switch using virtual input queues.
Figure 7:
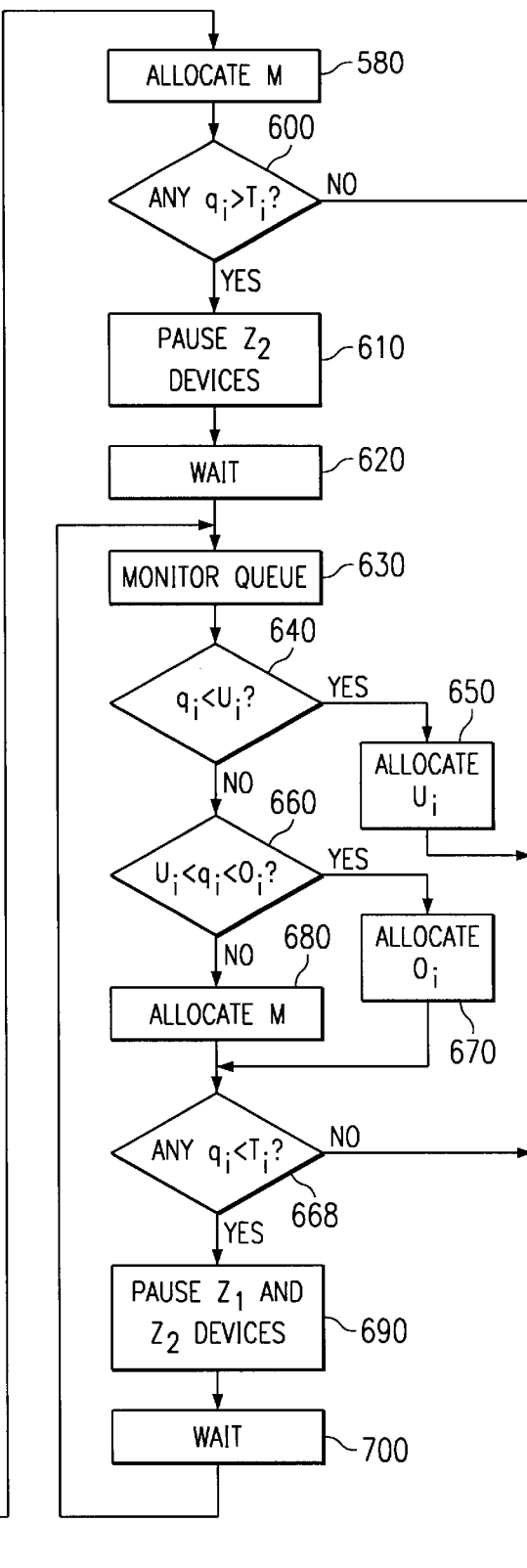

A process of a dynamic memory allocation method may be described by FIG. 7. FIG. 7 provides a block flow diagram of a preferred dynamic memory allocation algorithm of dynamic memory allocation in a shared memory Ethernet switch using virtual input queues. In a start up, step 410 a processor in the Ethernet switch determines the total memory available. Next, in a memory allocation, step 420, the shared memory is allocated among the virtual input queues 80. The memory may be allocated by any number of methods, perhaps providing each virtual input queue 80 an equal share of memory, but preferably by sharing the memory based on each virtual queues port bandwidth, as discussed above and shown in equation (2). Unlike the static memory allocation method, however, the dynamic memory allocation method reallocates memory periodically in a period called a control epoch as discussed above.

To accomplish dynamic memory allocation, the dynamic memory allocation algorithm queries the virtual input queues 80 at each control epoch for the instantaneous value of the input queue value in a monitor, step 430. Next, in a first test, step 440 the dynamic memory allocation algorithm checks to see if the instantaneous value of the virtual input queue, $q_i$, is less than the underutilization threshold, $U_i$, which is selected as discussed above. When the value of the virtual input queue, $q_i$, is less than the under utilization threshold, $U_i$, then the dynamic allocation algorithm assigns $U_i$ memory to that virtual input queue in an allocate $U_i$, step 450. If, in the first test, step 440, $q_i$ is not less than $U_i$ then the dynamic allocation algorithm proceeds to a second test, step 460. In the second test, step 460, the dynamic allocation algorithm tests to determine if the virtual input queue value, $q_i$, lies in between the under utilization threshold, $U_i$ and the overload threshold $O_i$, which is selected as discussed above. If $q_i$ lies between $U_i$ and $O_i$, then an $O_i$ amount of memory is assigned to that virtual input queue in an allocate $O_i$, step 470. If $q_i$ does not lie between $q_i$ and $O_i$ then the dynamic algorithm proceeds to an allocate memory, step 480.

In the allocate memory, step 480, all memory which has not been assigned in the allocate $U_i$, step 450, the allocate $O_i$, step 470, or reserved to account for response latencies ($D^{off}$), is divided among the remaining virtual input queues according to equation (7) to generate $T_i$ as discussed above. The allocate memory, step 480, may also assign memory evenly among these queues, assign memory based on each input queue's port bandwidth as shown in equation (1), or other methods of memory allocation. After the allocate memory, step 480, the dynamic memory allocation algorithm proceeds to a third test, step 500, where the virtual input queue is compared to the value for $T_i$. If a queue has been allocated memory in either an allocate $U_i$, step 450, an allocate $O_i$, step 470, or an allocate memory, step 480, and the value of the virtual input queue does not exceed $T_i$, then the dynamic memory allocation algorithm returns to the monitor queue, step 430. If $q_i > T_i$, then the upstream device supplying frames to that port is paused in a pause device, step 510. Because a device is paused, there is an indication that additional measures may be needed to avoid traffic overflow in the shared memory switch.

After waiting for the present epoch to end in wait for control epoch, step 520, the dynamic memory allocation algorithm again queries the queues in a second monitor queue, step 530. Next, in a fourth test, step 540 the dynamic memory allocation algorithm checks to see if the instantaneous value of the virtual input queue, $q_i$, is less than the underutilization threshold, $U_i$, which is selected as discussed above. When the value of the virtual input queue, $q_i$, is less than the under utilization threshold, $U_i$, then the dynamic allocation algorithm assigns $U_i$ memory to that virtual input queue in an allocate $U_i$, step 550. If, in the fourth test, step 540, $q_i$ is not less than $U_i$ then the dynamic allocation algorithm proceeds to a fifth test, step 560.

In the fifth test, step 560, the dynamic allocation algorithm tests to determine if the virtual input queue value, $q_i$, lies in between the under utilization threshold, $U_i$ and the overload threshold $O_i$, which is selected as discussed above. If $q_i$ lies between $U_i$ and $O_i$, then an $O_i$ amount of memory is assigned to that virtual input queue in an allocate $O_i$, step 570. If $q_i$ does not lie between $q_i$ and $O_i$ then the dynamic algorithm proceeds to an allocate memory, step 580. In the allocate memory, step 580, all memory which has not been assigned in the allocate $U_i$, step 450, the allocate $O_i$, step 570, or reserved to account for response latencies ($D^{off}$), is divided among the remaining virtual input queues according to equation (7) to generate $T_i$ as discussed above. The allocate memory, step 580, may also assign memory evenly among these queues, assign memory based on each input queue's port bandwidth as shown in equation (1), or other methods of memory allocation.

After the allocate memory, step 580, the dynamic memory allocation algorithm proceeds to a sixth test, step 600, where all virtual input queues are compared to the value for $T_i$. If the queue has been allocated memory in either an allocate $U_i$, step 550, an allocate $O_i$, step 570, or an allocate memory, step 580, and the value of the virtual input queue does not exceed $T_i$, then the dynamic memory allocation algorithm returns to the monitor queue, step 430. If $q_i > T_i$, then all upstream devices supplying frames to port operating at greater than $O_i$ are paused in a pause Zone 2 devices, step 610. Because Zone 2 devices are paused, there is an indication that even additional measures may be needed to avoid traffic overflow in the shared memory switch. The existing memory allocations for each queue remain in effect until the end of a present epoch, indicated as a wait, step 620. At the end of the wait, step 620, the dynamic allocation algorithm resumes monitoring the virtual input queues in monitor queue, step 630.

Next, in a seventh test, step 640 the dynamic memory allocation algorithm checks to see if the instantaneous value of the virtual input queue, $q_i$, is less than the underutilization threshold, $U_i$, which is selected as discussed above. When the value of the virtual input queue, $q_i$, is less than the under utilization threshold, $U_i$, then the dynamic allocation algorithm assigns Ui memory to that virtual input queue in an allocate $U_i$, step 650. If, in the seventh test, step 640, $q_i$ is not less than $U_i$ then the dynamic allocation algorithm proceeds to an eighth test, step 660. In the eighth test, step 660, the dynamic allocation algorithm tests to determine if the virtual input queue value, $q_i$, lies in between the under utilization threshold, $U_i$ and the overload threshold $O_i$, which is selected as discussed above. If $q_i$ lies between $U_i$ and $O_i$, then an $O_i$ amount of memory is assigned to that virtual input queue in an allocate $O_i$, step 670. If $q_i$ does not lie between $q_i$ and $O_i$ then the dynamic algorithm proceeds to an allocate memory, step 680. In the allocate memory, step 680, all memory which has not been assigned in the allocate $U_i$, step 650, or allocated in the allocate $O_i$, step 670, or reserved to account for response latencies ($D^{off}$), is divided among the remaining virtual input queues according to equation (7) to generate $T_i$ as discussed above. The allocate memory, step 680, may also assign memory evenly among these queues, assign memory based on each input queue's port bandwidth as shown in equation (1), or other methods of memory allocation.

After the allocate memory, step 680, the dynamic memory allocation algorithm proceeds to a ninth test, step 668, where all virtual input queues are compared to the value for $T_i$. If a queue has been assigned memory in either an allocate $U_i$, step 650, a allocate Oi, step 670, or a allocate memory, step 680, and the value of the virtual input queue does not exceed $T_i$, then the dynamic memory allocation algorithm returns to the monitor queue, step 430. If $q_i > T_i$, then the upstream device supplying frames to ports pre-allocated memory, or preallocated $O_i$ memory are paused in a pause Zone 1 and Zone 2 devices, step 690. After pausing until the end of the present epoch in wait, step 700, the dynamic memory allocation algorithm returns to the monitor queue, step 630.

The dynamic threshold scheme is somewhat more complicated than the static counterpart but still warrants a low cost implementation in an Ethernet switch. Its major advantage is to allow better utilization of the memory capacity sharing among ports, particularly when the traffic load among ports is asymmetric and/or non-uniform.

Simulation results

Figure 8:
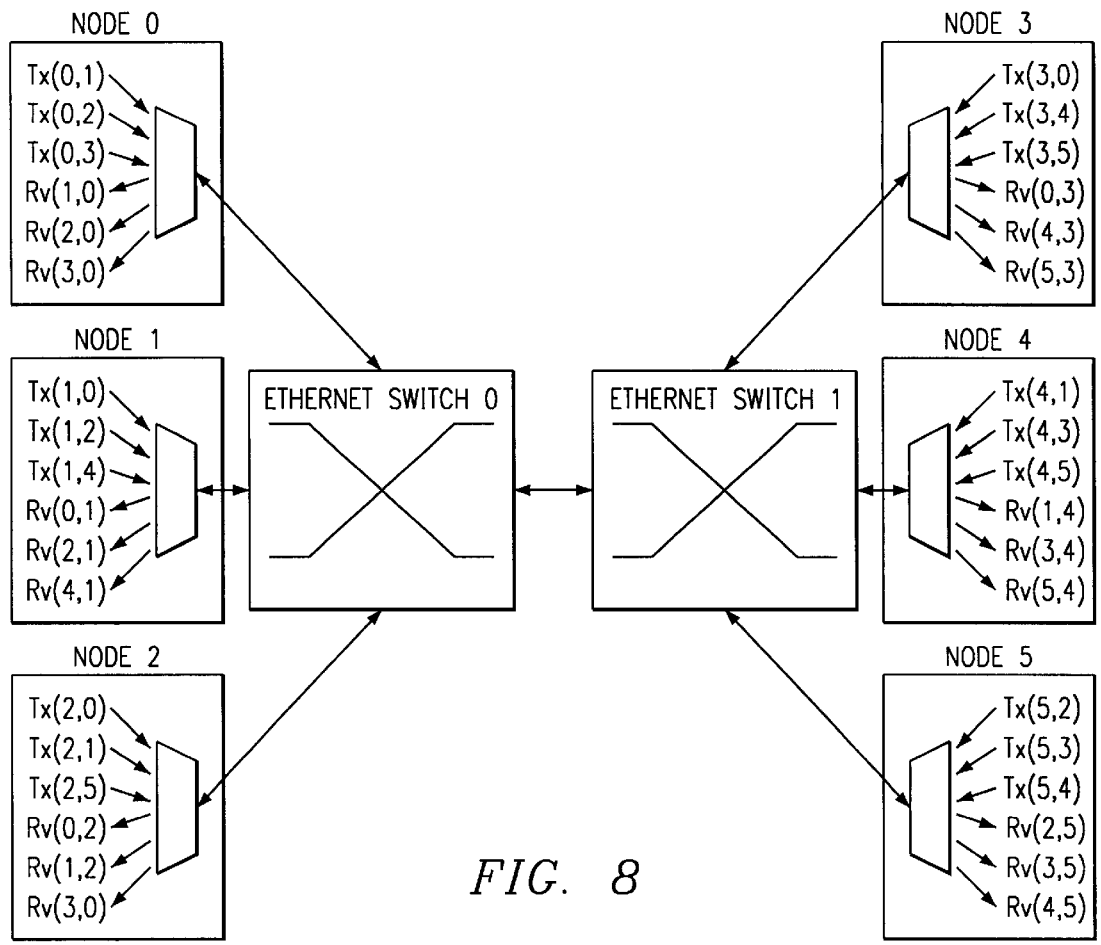
FIG. 8 illustrates a LAN utilizing two Ethernet switches that are used in the demonstration of the present invention.

We investigate performance of the static threshold scheme and the dynamic threshold scheme based on virtual input queueing. The simulated two-switch network, modeled by using Opnet molder, is shown in FIG. 8. It consists of two 4-port 10 Base-T (bandwidth 10 Mbits/s) Ethernet switches, each connected to three workstations (nodes). The two switches are connected to each other through the forth ports. The cable connecting the two switch is 500 meter and the cable connecting each workstation to the switch is 25 meters. All the links are full duplex. The switches are shared memory, output queued switches. The proposed static threshold scheme and the dynamic threshold scheme based on the virtual input queueing are incorporated in the switch model. Each workstation runs three TCP sessions for transmission and three TCP sessions for receiving. The sources and destinations of the TCP sessions are shown in FIG. 8. For instance, Tx(i,j) denotes transmission process with source at Node i and destination Node j and Rv(i,j) denotes receiving process at Node j from source Node i. MAC layer of a workstation has ability of starting or stop-ping transmission of Ethernet frames, upon request from the connected switch port via an ON or OFF control frame. The data frame size at application layer is fixed at 1,000 bytes. It is encapsulated in TCP frame, IP frame and Ethernet frame in turn at the transmission side. Decapsulation is performed at the receiving node. We also assume that each TCP transmission process always has data to send. This seems to be the most stringent traffic condition to test the flow control schemes for switched Ethernet.

For static threshold scheme, each virtual input queue has a partitioning of ¼ total memory pool following Equation (1). The difference between the per port memory sharing and the high-water mark is $3 \times L_{max} + 2$ BR/(8 bytes). The reason using the factor 3 in the model instead of 2 is that in the Opnet model, a frame arrival occurs instantly, not in a form of a steady stream. As a result, up to 3 maxi-mum size frames may be received after a port decides to send an OFF frame. The low-water mark is 2 maximum size frame lower than the high-water mark. For the dynamic threshold scheme, $O_i$ is chosen the same as $M_i$ and $U_i$ is set at 2 maximum frame size.

In all the simulation run, both the static threshold scheme and the dynamic threshold scheme may realize loss free transmission. We also simulated another simple scheme which sends OFF frames to all ports when the total buffer occupancy in the shared memory switch approaches the memory capacity. We have found that this approach, while easy to implement, may lead to deadlock for the network configuration considered here. The reason is that when both of the switches are filled with frames destined to the other switch, they send out OFF frames to all ports including the ports interconnecting the two switches. As a result, no frame can be sent from one switch to the other and a deadlock occurs.

Figure 9:
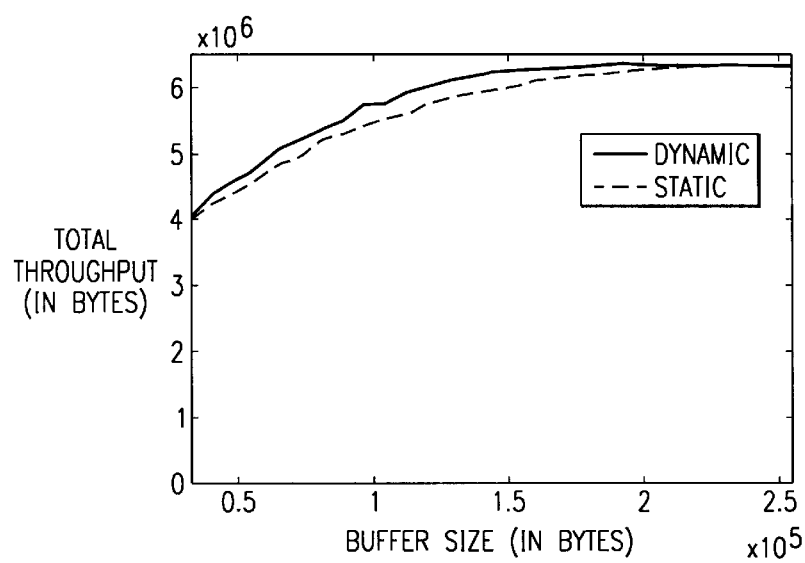
FIG. 9 plots the throughput of the static and the dynamic memory allocation systems and methods.

In FIG. 9, we compare the total throughput over all the nodes for the static threshold scheme and the dynamic threshold scheme. In both the schemes, the throughput increases initially as the buffer size then become saturate. However, the point at which the throughput-buffer size curve reaches saturation is different. For the static scheme, the total throughput reaches the maximum when the buffer size is greater than 200 Kbytes. For the dynamic scheme, the maximum is achieved when the buffer size is greater than about 160 Kbytes. For a given buffer size not in the saturation region, the dynamic scheme achieve higher throughput. This shows that the dynamic threshold scheme utilizes memories more efficiently than the static scheme as expected. However, the difference seems to be not very significant.

Figure 10:
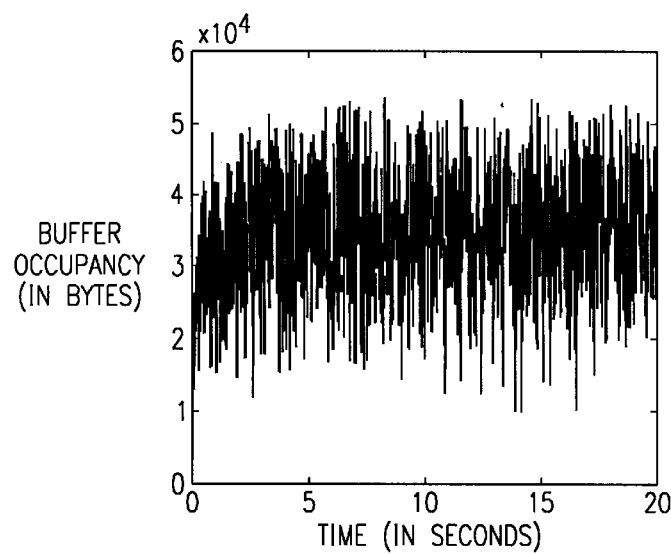
FIG. 10 plots the buffer occupancy from the simulation of the static memory allocation method.
Figure 11:
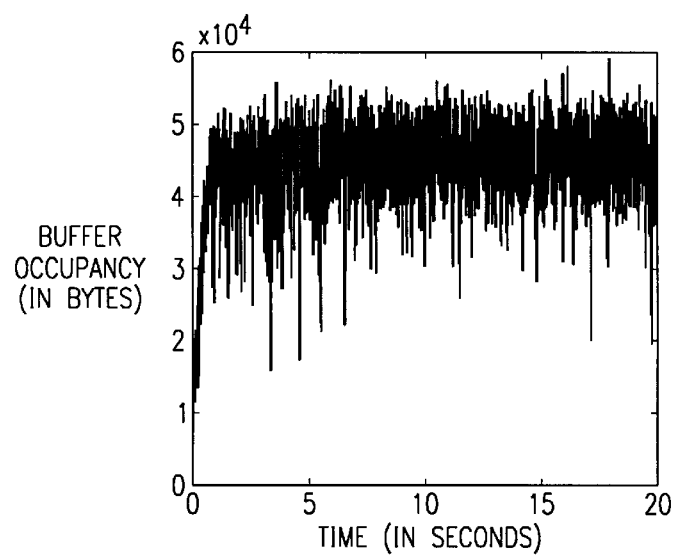
FIG. 11 plots the buffer occupancy from the simulation of the dynamic memory allocation method.

In FIG. 10 and FIG. 11, we plot the total buffer occupancy for the static threshold scheme and the dynamic threshold scheme, respectively. The total buffer size is fixed at 64 Kbytes. As we may see from the plots, both the static and dynamic threshold schemes protect the buffer from overflow well. However, the dynamic threshold scheme has higher buffer occupancy in general.

Figure 2:
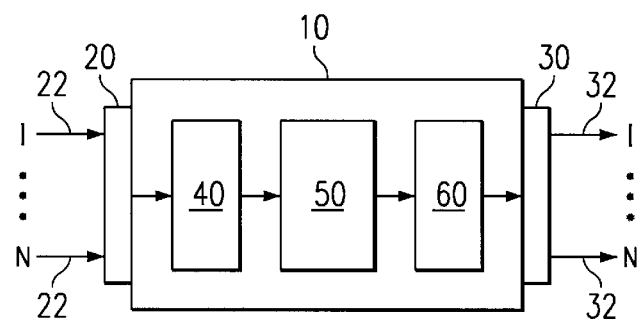
FIG. 2 is a block diagram of a shared memory Ethernet switch.
Figure 3:
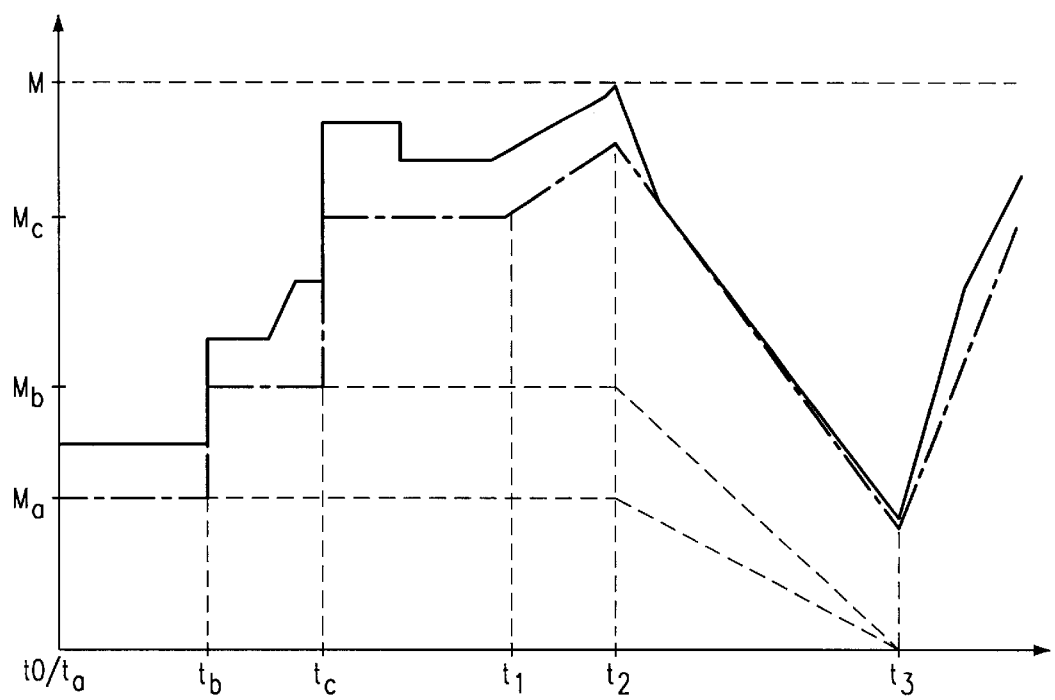
FIG. 3 graphically illustrates how switch congestion can degrade system performance.
Figure 12:
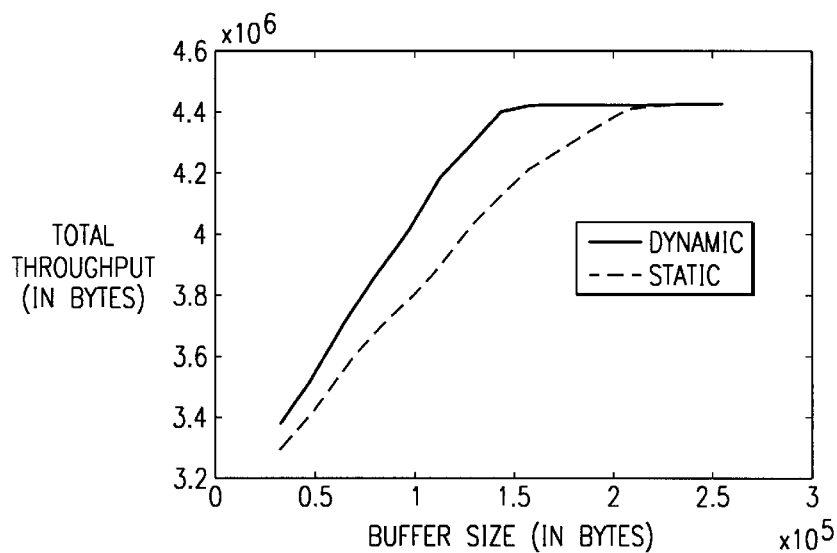
FIG. 12 plots the total throughput for each of the static and dynamic memory allocation methods verses the buffer size.

Finally, we compare the two schemes under asymmetric traffic. In order to obtain a simple asymmetric traffic scenario, we set the start time of Node 0 and Node 5 to be a time greater than the simulation time. Thus, neither Node 0 nor Node 5 sends any data traffic. Nevertheless, the three receiving process in each of the nodes receive data traffic from other nodes and send back acknowledgment frames. In FIG. 12, we plot the total throughput of the two schemes vs. Buffer size. Similar Tenedos as that in FIG. 2 is observed. For the asymmetric traffic, the dynamic threshold achieves slightly greater improvement for a given buffer size over the static threshold scheme.

The present invention provides a static and a dynamic threshold flow control scheme for switched Ethernet which uses the concept of the virtual input queueing. Simulation results have shown that both the static and the dynamic threshold schemes can achieve loss free transmission in a switch without causing deadlock. In general, the dynamic threshold scheme has better buffer utilization. Thus, it obtains some what higher throughput for a given buffer size in a non-saturation region. Analysis and implementation of the static scheme is extremely straight-forward. The dynamic scheme requires update of the dynamic threshold and check of the overflow condition over short control period. We feel that for practical purpose, the static threshold scheme achieves reasonable buffer utilization and throughput. However, the dynamic threshold scheme obtains better performance when memory size is relatively small. The analysis and simulation in the report may help designers to select a proper flow control scheme for an Ethernet switch to prevent buffer overflow and achieve reasonable network performance.

While the invention has been described in conjunction with preferred embodiments, it should be understood that modifications will become apparent to those of ordinary skill in the art and that such modifications are therein to be included within the scope of the invention and the following claims.

We claim:

1. In an Ethernet switch having a shared memory, a method for managing frame traffic in a switch, comprising:
   partitioning the shared memory among a plurality of virtual input queues to create a memory value for a virtual input queue which monitors an input port;
   incrementing the virtual input queue when a frame arrives at the input port; and
   pausing an upstream device if the incremented value of the virtual input queue exceeds the memory value for the virtual input queue; and
   the partitioning step divides the memory among the virtual input queues proportionately to the data rate of each of the plurality of virtual input queues.

2. The method of claim 1 wherein the incrementing step increases the value of the virtual input queue an amount based on the size of the frame.

3. The method of claim 1 wherein the decrementing step decreases the value of the virtual input queue an amount based on the size of the frame.

4. The method of claim 1 wherein the pausing step pauses the upstream device for a predetermined period of time.

5. The method of claim 1 wherein the pausing step pauses the upstream device for a predetermined number of data transfers.

6. The method of claim 1 further comprising monitoring an output port and decrementing the value of the input queue when the frame departs the Ethernet switch.

7. The method of claim 6 further comprising activating the upstream device when the value of the virtual input queue is less than the memory value.

8. In an Ethernet switch having a shared memory, a method for managing frame traffic in a switch, comprising:
   partitioning the shared memory among a plurality of virtual input queues to create a memory value for a virtual input queue;
   dividing the memory among the virtual input queues proportionately to the data rate of each of the plurality of virtual input queues;
   monitoring frame traffic at an input port with the virtual input queue;
   detecting the arrival of a frame at the input port;
   incrementing the virtual input queue;
   testing whether or not the incremented value of the virtual input queue exceeds the memory value for the virtual input queue; and
   pausing an upstream device if the incremented value of the virtual input queue exceeds the memory value for the virtual input queue.

9. In an Ethernet switch having a shared memory, a method for managing frame traffic in a switch, comprising:
   partitioning the shared memory among a plurality of virtual input queues to create a first set of memory values such that a virtual input queue which monitors an input port has a memory value;
   incrementing the virtual input queue when a frame arrives at the input port; and
   repartitioning the shared memory among the plurality of virtual input queues to update the memory value of the virtual input queue, such that the second set of memory values is based on the data rate of the input port.

10. The method of claim 9 further comprising pausing an upstream device connected to the input port if the incremented value of the virtual input queue exceeds the memory value for the virtual input queue.

11. The method of claim 9 wherein the partitioning step divides the memory evenly among the plurality of virtual input queues.

12. The method of claim 9 wherein the partitioning step divides the memory among the virtual input queues proportionately to the data rate of each of the plurality of virtual input queues.

13. The method of claim 9 wherein the repartitioning step further classifies data rates into a plurality of data rate zones.

14. The method of claim 13 wherein the repartitioning step further classifies the data rates into three data rate zones: an underutilization zone, a normal zone, and an overutilization zone.

15. The method of claim 14 wherein the repartitioning step further comprises defining an underutilization threshold that comprises a boundary between the underutilization zone and the normal zone, and defining an overutilization threshold that comprises a boundary between the normal zone and the overutilization zone, the underutilization threshold is a lower data rate than the overutilization threshold.

16. The method of claim 15 wherein the repartitioning step further comprises assigning the virtual input queue a minimum memory if the virtual input queue value is less than the underutilization threshold, and a normal memory if the virtual input queue value is at least equal to the underutilization threshold.

17. The method of claim 15 wherein the repartitioning step further comprises assigning the virtual input queue a proportioned memory, the proportioned memory is allocated from the shared memory not assigned to other virtual input queues.

18. The method of claim 16 wherein the minimum memory comprises a data latency memory portion.

19. The method of claim 16 wherein the underutilization threshold is three maximum data frame sizes lower than the overutilization threshold.

20. The method of claim 10 wherein the pausing step pauses an upstream device if its virtual input queue value exceeds a proportioned memory value.

21. The method of claim 10 wherein the pausing step pauses an upstream device if its virtual input queue value exceeds an overutilization threshold value.

22. The method of claim 10 wherein the pausing step pauses an upstream device if its virtual input queue value exceeds an underutilization threshold value.

23. The method of claim 10 wherein the pausing step pauses the upstream device for a predetermined period of time.

24. The method of claim 10 wherein the pausing step pauses the upstream device for a predetermined number of data transfers.

25. The method of claim 9 further comprising monitoring an output port and decrementing the value of the input queue when the frame departs the Ethernet switch.

26. The method of claim 9 further comprising activating the upstream device when the value of the virtual input queue is less than the memory value.

27. The method of claim 17 wherein the proportioned memory value is the value obtained by subtracting: memory allocated to virtual input queues having minimum memory, memory allocated to virtual input queues having normal memory, and latency memory requirements from total memory, and then distributing the difference to the remaining virtual input queues based on data transfer rates.

* * * * *